US005706990A

United States Patent [19]
Lahrson

[11] Patent Number: 5,706,990
[45] Date of Patent: Jan. 13, 1998

[54] ATV UTILITY MOUNT AND ATTACHMENT

[76] Inventor: Reed M. Lahrson, P.O. Box 873411, Wasilla, Ala. 99687

[21] Appl. No.: 726,990

[22] Filed: Oct. 7, 1996

[51] Int. Cl.$^6$ .................................................. B60R 9/08
[52] U.S. Cl. .................. 224/410; 224/401; 224/913; 224/558; 224/567; 211/64
[58] Field of Search .................................. 224/410, 401, 224/408, 912, 913, 319, 555, 558, 545, 533, 535, 567, 569; 248/552; 211/64

[56] References Cited

U.S. PATENT DOCUMENTS

| | | | |
|---|---|---|---|
| 2,501,270 | 3/1950 | Fleming | 224/913 |
| 3,744,687 | 7/1973 | Oreck | 224/913 |
| 4,189,274 | 2/1980 | Shaffer | 224/558 |
| 4,247,030 | 1/1981 | Amacker | 224/913 |
| 4,823,673 | 4/1989 | Downing | 224/401 |
| 5,108,020 | 4/1992 | Patrick et al. | 224/319 |

*Primary Examiner*—Henry J. Recla
*Assistant Examiner*—Charles R. Eloshway

[57] ABSTRACT

An ATV utility mount and attachment including a mounting mechanism. The mounting mechanism has a plate member with a pair of pin tubes attached to a front side. A pair of U-bolts, each having a pair of prongs, are positionable about a gear rack of an ATV. Each U-bolt is fastened to the gear rack and the plate simultaneously. A pair of L-pins are included. Each L-pin has a vertical extent integral with a horizontal extent with a connecting curve therebetween. The vertical extent of each L-pin is positioned within one of the pin tubes of the mounting mechanism, when the plate is fastened to the gear rack by the pair of U-bolts. Lastly, an accessory for coupling to the mounting mechanism for transporting on the ATV is included.

10 Claims, 5 Drawing Sheets

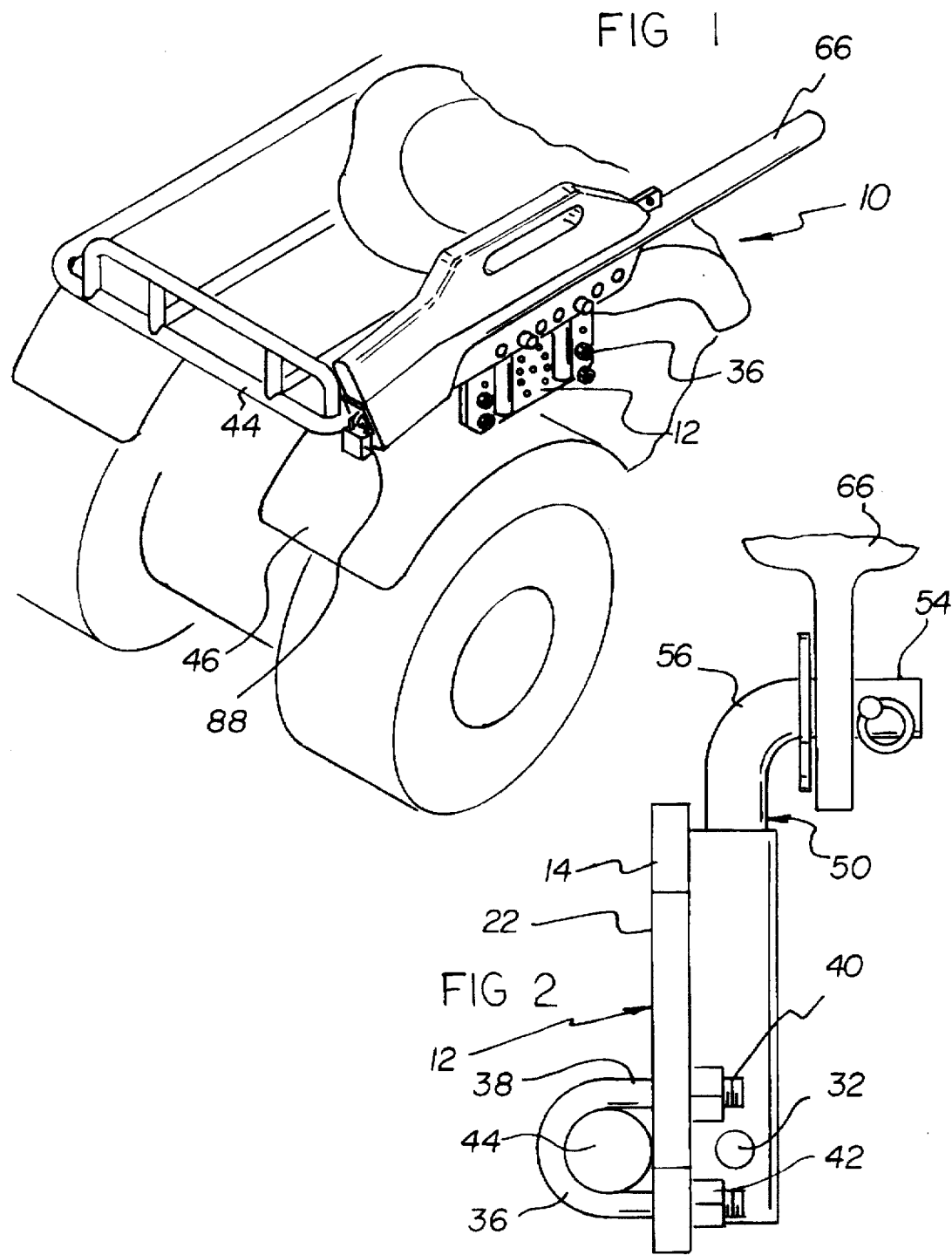

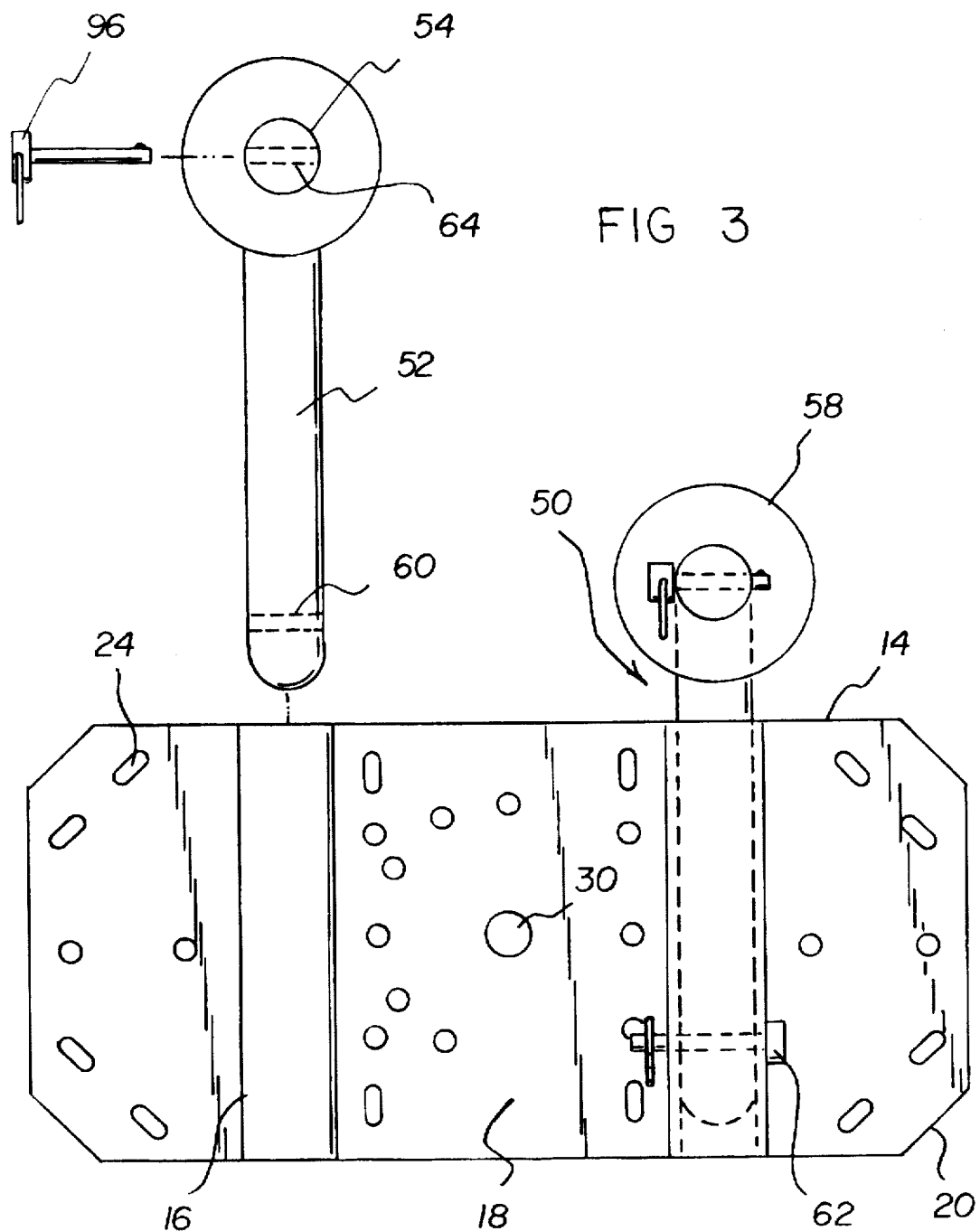

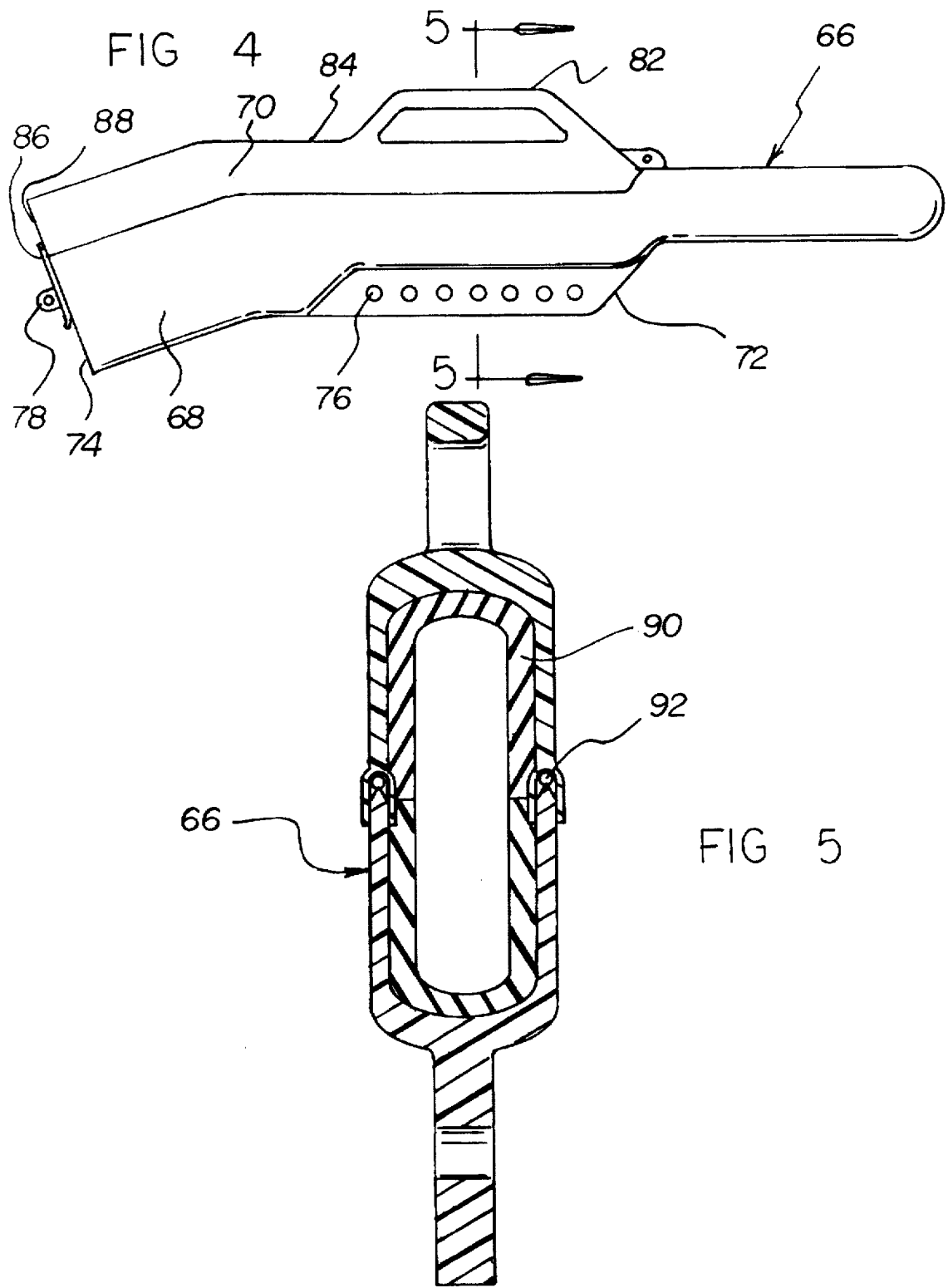

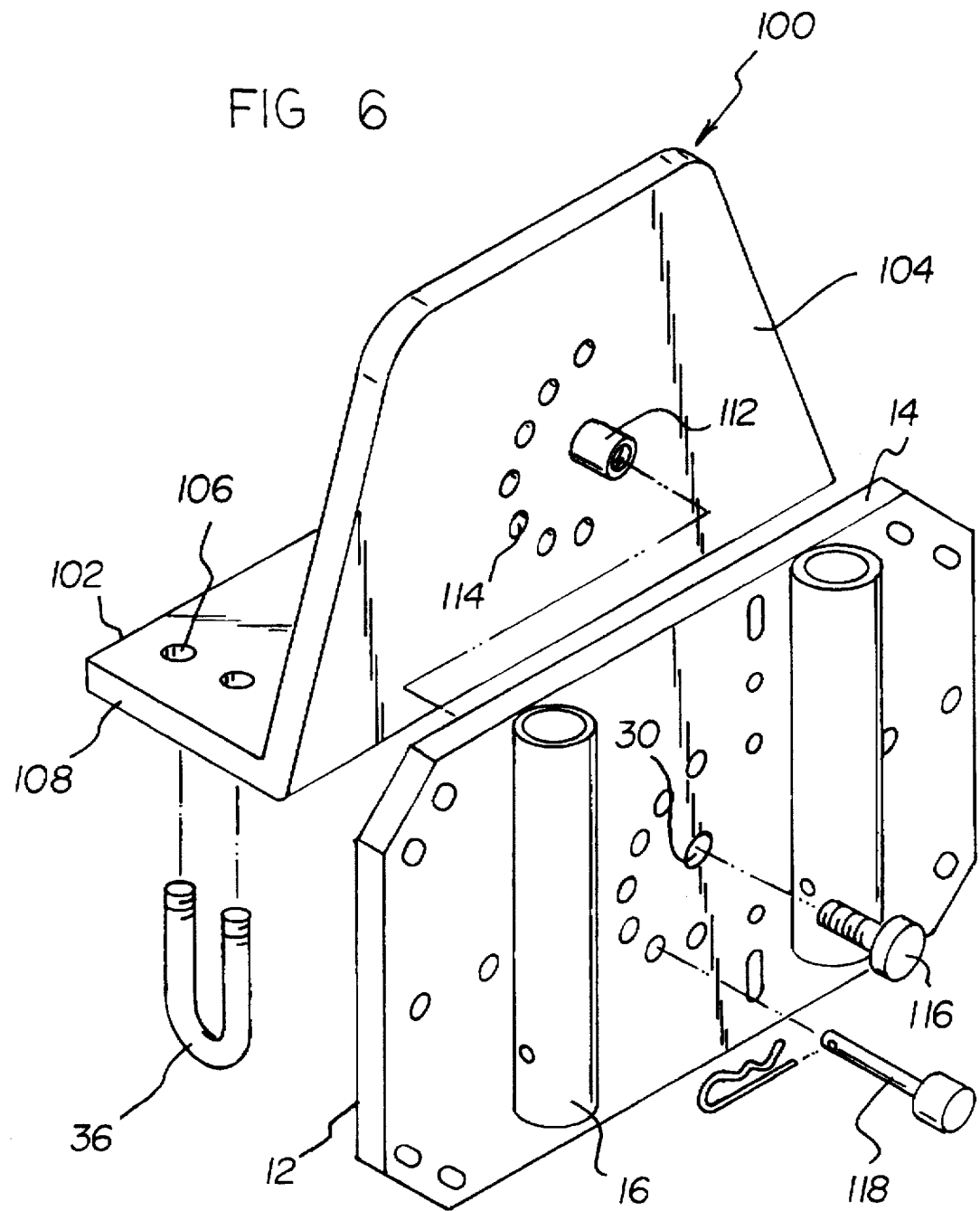

ATV UTILITY MOUNT AND ATTACHMENT

BACKGROUND OF THE INVENTION

1. Field of the Invention

The present invention relates to an ATV utility mount and attachment and more particularly pertains to providing a mounting mechanism that will couple to the rack of an ATV and further support a variety of hunting and camping accessories.

2. Description of the Prior Art

The use of a mounting mechanism is known in the prior art. More specifically, mounting mechanisms heretofore devised and utilized for the purpose of supporting hunting and camping accessories are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,915,273 to Allen a discloses a bow and gun holder for offroad vehicles. U.S. Pat. No. 4,197,951 to Shassere discloses a mounting rack for guns and the like. U.S. Pat. No. 5,078,279 to Hancock and Gates discloses a gun rack. U.S. Pat. No. 5,116,010 to McMasters and Wetzel discloses a vehicular weapon support. U.S. Pat. No. 4,131,202 to Hansen discloses a console gun rack. Lastly, U.S. Pat. No. 4,108,313 to Bogar discloses a vehicle mounted gun rack with mounting brackets.

While these devices fulfill their respective, particular objectives and requirements, the aforementioned patents do not describe an ATV utility mount and attachment that allows the mount mechanism to be coupled to the rack of the ATV and coupled to an attachment like unto a gun scabbard, a tire mount or a rod carrier.

In this respect, the ATV utility mount and attachment according to the present invention substantially departs from the conventional concepts and designs of the prior art, and in doing so provides an apparatus primarily developed for the purpose of providing a mounting mechanism that will couple to the rack of an ATV and further support a variety of hunting and camping accessories.

Therefore, it can be appreciated that there exists a continuing need for a new and improved ATV utility mount and attachment which can be used for providing a mounting mechanism that will couple to the rack of an ATV and further support a variety of hunting and camping accessories. In this regard, the present invention substantially fulfills this need.

SUMMARY OF THE INVENTION

In view of the foregoing disadvantages inherent in the known types of mounting mechanisms now present in the prior art, the present invention provides an improved ATV utility mount and attachment. As such, the general purpose of the present invention, which will be described subsequently in greater detail, is to provide a new and improved ATV utility mount and attachment and method which has all the advantages of the prior art and none of the disadvantages.

To attain this, the present invention essentially comprises a mounting mechanism. The mounting mechanism has a plate member with a pair of cylindrical pin tubes. The plate member has a front side and a back side with a plurality of holes therethrough. The plate member has a center hole therethrough that is proportionately spaced from the pair of pin tubes. The pair of pin tubes are fixedly attached to the front side of the plate member. Each pin tube has an axial hole. Included are a pair of U-bolts. Each U-bolt has a pair of prongs. Each prong has a threaded end capable of receiving a nut. One of each of the U-bolts is positionable about a gear rack of an ATV. The pair of prongs of each U-bolt, are positioned through two of the plurality of holes of the plate, to couple the plate to the gear rack. Each U-bolt is fastened to the gear rack and the plate, simultaneously, when the prongs are positioned through the holes and each threaded end is engaged by the nut. A pair of L-pins are provided. Each L-pin has an elongated vertical extent integral a horizontal extent with a connecting curve between the extents. The vertical extent of each L-pin is positionable within one of the pin tubes of the mounting mechanism. Each horizontal extent has a neck ring positioned thereon and adjacent the connecting curve. Each vertical extent has a horizontal opening therethrough. Each horizontal opening of each vertical extent is capable of aligning with the axial hole of the corresponding pin tube when the L-pin is positioned therein. The pair of L-pins are lockingly positioned within the pin tubes when the plate is fastened to the gear rack by the pair of U-bolts. Lastly, included is a rifle scabbard that has a housing member with a cover hingedly attached. The housing member has a bottom side with a mounting flange and a rear end. The mounting flange has a plurality of axial holes. The rear end of the bottom side has a hook member. The cover has a handle projecting from a top side thereof and a latch attached to a rear end of the cover. The latch is positioned over the hook of the housing for securing a rifle within the scabbard. The holes of the mounting flange are capable of receiving the horizontal extents of the L-pin for coupling the scabbard to the mounting mechanism. Whereby when the plate is fastened to the gear rack the scabbard is mounted thereto for transporting on the ATV.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved ATV utility mount and attachment which has all of the advantages of the prior art mounting mechanisms and none of the disadvantages.

It is another object of the present invention to provide a new and improved ATV utility mount and attachment which may be easily and efficiently manufactured and marketed.

5,706,990

3

It is further object of the present invention to provide a new and improved ATV utility mount and attachment which is of durable and reliable constructions.

An even further object of the present invention is to provide a new and improved ATV utility mount and attachment which is susceptible of a low cost of manufacture with regard to both materials and labor, and which accordingly is then susceptible of low prices of sale to the consuming public, thereby making such ATV utility mount and attachment economically available to the buying public.

Even still another object of the present invention is to provide a ATV utility mount and attachment for providing a mounting mechanism that will couple to the rack of an ATV and further support a variety of hunting and camping accessories.

Lastly, it is an object of the present invention to provide a new and improved ATV utility mount and attachment including a mounting mechanism. The mounting mechanism has a plate member with a pair of pin tubes attached to a front side. A pair of U-bolts, each having a pair of prongs, are positionable about a gear rack of an ATV. Each U-bolt is fastened to the gear rack and the plate simultaneously. A pair of L-pins are included. Each L-pin has a vertical extent integral a horizontal extent with a connecting curve therebetween. The vertical extent of each L-pin is positioned within one of the pin tubes of the mounting mechanism, when the plate is fastened to the gear rack by the pair of U-bolts. Lastly, an accessory with an attaching means for coupling to the mounting mechanism for transporting on the ATV.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the ATV utility mount and attachment constructed in accordance with the principles of the present invention.

FIG. 2 is side view of the mounting mechanism of the present invention.

FIG. 3 is a front view of the mounting mechanism with an exploded view of the operable components.

FIG. 4 is side elevational view of a scabbard attachment of the present invention.

FIG. 5 is a cross-sectional view of the attachment of FIG. 4 taken along line 5—5.

FIG. 6 is an accessory attachment for the mounting mechanism of the present invention.

4

Figure 7:
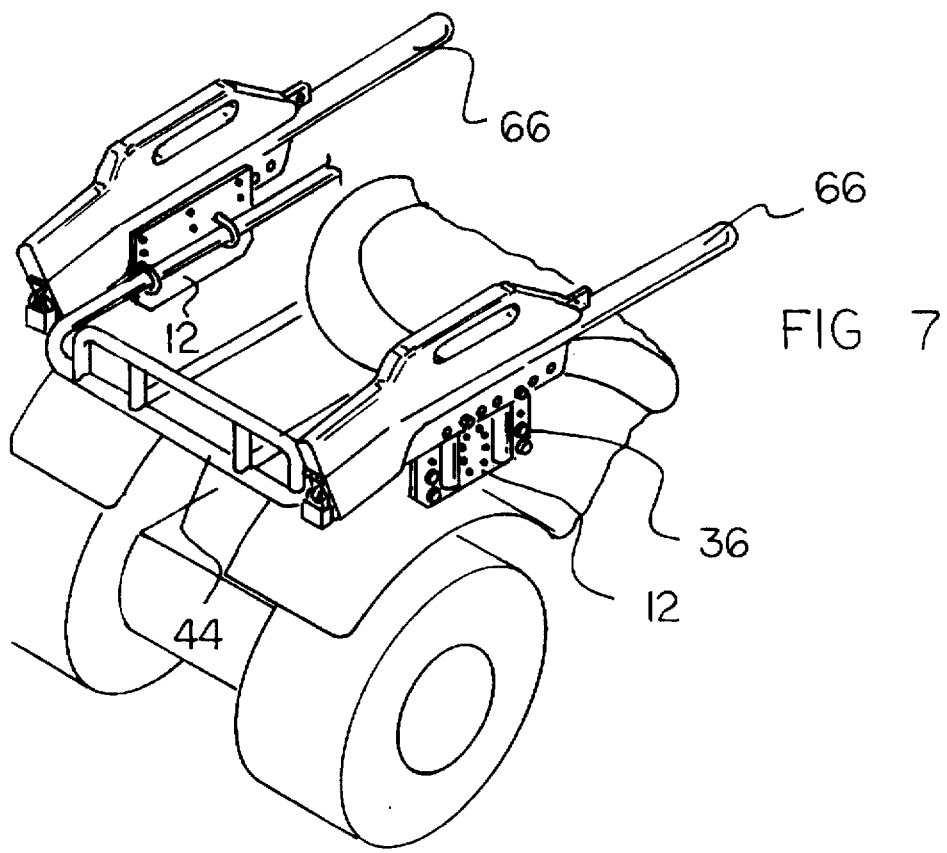
FIG. 7 is a perspective view of the ATV utility mount and attachment with a rifle supported on each side of the rack of the present invention.

The same reference numerals refer to the same parts through the various Figures.

DESCRIPTION OF THE PREFERRED EMBODIMENT

With reference now to the drawings, and in particular to FIG. 1 thereof, the preferred embodiment of the new and improved ATV utility mount and attachment embodying the principles and concepts of the present invention and generally designated by the reference numeral 10 will be described.

The present invention, the ATV utility mount and attachment 10 is comprised of a plurality of components. Such components in their broadest context include a mounting mechanism, a U-bolt, an L-pin and an attachment. Such components are individually configured and correlated with respect to each other so as to attain the desired objective.

Specifically, the present invention includes a mounting mechanism 12. The mounting mechanism has a plate member 14 with a pair of cylindrical pin tubes 16, as seen in FIG. 3. The plate member is formed of a flat stock steel and is generally rectangular with taper corners 20. The plate member has a front side 18 and a back side 22 with a plurality of holes 24 through the plate. The holes are arranged along the plate in corresponding pairs. The pairs are located near each tapered corner, on outer sides of the pin tubes and between the pin tubes. The plate member has a center hole 30 therethrough and proportionately spaced from the pair of pin tubes. The center hole has a diameter greater than the diameter of the plurality of holes. The pair of pin tubes, as seen in FIG. 2, are fixedly attached to the front side of the plate member. Each pin tube has an axial hole 32 therethrough.

Included are a pair of U-bolts 36. Each U-bolt has a pair of prongs 38. Each prong, as seen in FIG. 2, has a threaded end 40 capable of receiving a nut 42. One of each of the U-bolts is positionable about a gear rack 44 of an ATV 46. The pair of prongs of each U-bolt are positioned through two of the plurality of holes of the plate member 14 for coupling the plate member to the gear rack. Each U-bolt is fastened to the gear rack and the plate member, simultaneously, when the prongs are positioned through the holes and each threaded end is engaged by the nut.

Additionally, a pair of L-pins 50 are provided. Each L-pin has an elongated vertical extent 52 integral with a horizontal extent 54 with a connecting curve 56 between the extents. The vertical extent of each L-pin is positionable within one of the pin tubes of the mounting mechanism, as shown in FIG. 3. Each horizontal extent has a neck ring 58 positioned thereon and adjacent the connecting curve. Each vertical extent has a horizontal opening 60. The horizontal opening is capable of aligning with the axial hole of the corresponding pin tube when the L-pin is positioned within. A clevis pin 62 is positioned through horizontal opening and the axial hole when they are in alignment. The pair of L-pins are locked is position within the pin tubes, by the clevis pin, when the plate member is fastened to the gear rack by the pair of U-bolts. Each horizontal extent has a bore hole 64.

Figure 8:
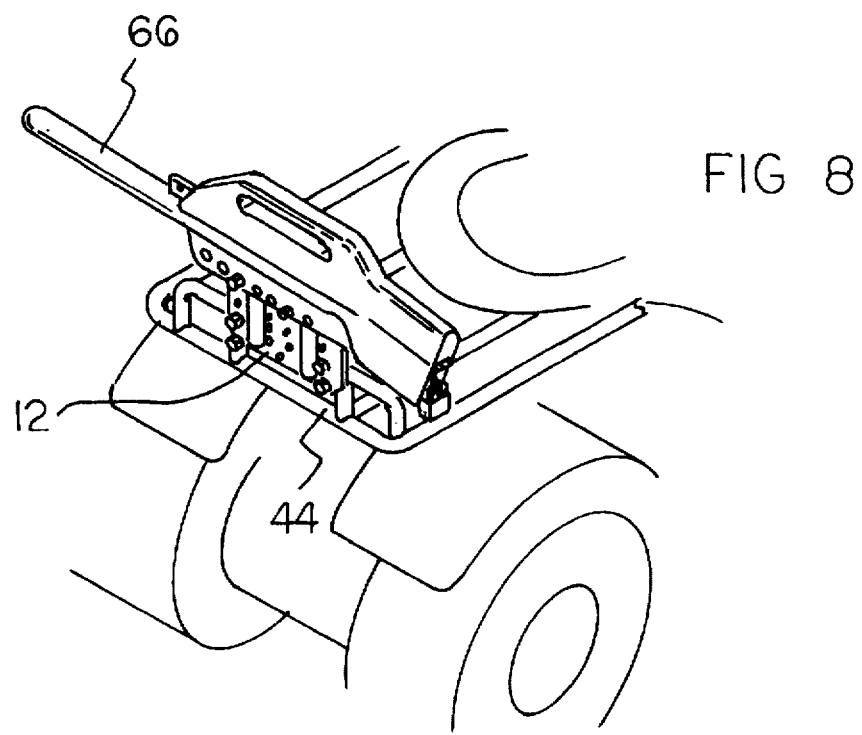
FIG. 8 is a perspective view of the preferred embodiment of ATV utility mount and attachment constructed in accordance with the principles of the present invention.

Lastly, an accessory with an attaching means is provided. The attaching means is for coupling the accessory to the mounting mechanism for transporting on the ATV. In FIG. 1, the accessory is a rifle scabbard 66. The rifle scabbard, when coupled to the attaching means, is preferably supported at the rear of the gear rack 44 of the ATV 46. FIG. 8 depicts the rifle scabboard and attaching means coupled to the rear of the gear rack. Also, as seen in FIG. 7, the gear rack will support two rifle scabbards and their attaching means.

The rifle scabbard has a housing member 68 with a cover 70 hingedly attached. The housing member has a bottom side with a mounting flange 72 and a rear end 74. The mounting flange is the attaching means for this accessory. The mounting flange has a plurality of axial holes 76. The rear end of the bottom side has a hook member 78. The cover has a handle 82 projecting from a top side 84 of the cover. The cover has a latch 86 attached to a rear end 88 of the cover. The latch is positionable over the hook of the housing for securing a rifle within the scabbard with a pad lock 88.

The scabbard has rubber insulation 90 lining the interior of the housing and cover. The rubber insulation prevents the rifle within the scabbard from moving around. Also, a pair of gaskets 92, as seen in FIG. 5, are included. The gaskets prevent water seepage into the scabbard. The holes of the mounting flange are capable of receiving the horizontal extents of the L-pin for coupling the scabbard to the mounting mechanism. The scabbard is locked in position by a pair of tractor pins 96 that are positioned through the bore hole 64 of each horizontal extent. Whereby, when the plate member is fastened to the gear rack the scabbard is mounted to the mounting plate for transporting on the ATV.

Furthermore, the accessory may be a bracket member 100 as shown in FIG. 6. The bracket member has a base plate 102 with a vertical plate 104 extending upwardly therefrom. The base plate has axial hole pairs 106 spaced from an end edge 108 of each side of the base plate. The vertical plate, of this accessory, is the attaching means. The vertical plate has a pivot tube 112 and a plurality of angle holes 114. The pivot tube is positioned within the center hole 30 of the plate member of the mounting mechanism when in use. The pivot tube is threaded and is held in position by a screw 116.

The bracket is coupled to the gear rack 44 of the ATV 46 with a pair of U-bolts 36. Once the bracket is fastened in position the mounting mechanism is allowed to rotate about pivot tube. Once the desired position of the mounting mechanism is obtained the plate member is locked to the bracket with a locking pin 118. The accessory may then be coupled with the L-pins within the mounting mechanism.

Finally, the present invention is not limited to the scabbard accessory. The accessories that may be included with the present invention are a spare tire mount, an impact tube, a camping table and a lantern hanger. The spare tire mount would have a attaching means for engaging the L-pins when position within the pin tubes of the mounting mechanism. The impact tube would having a mounting flange similar to the scabbard. The impact tube would be use to transport a plurality of fishing poles. The camping table would not required an attaching mount and mount directly to the L-pins. Lastly, the lantern hanger has a pole positionable within any one of the pin tubes of the mounting mechanism.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved ATV utility mount and attachment comprising in combination:

a mounting mechanism having a plate member with a pair of cylindrical pin tubes, the plate member having a front side and a back side with a plurality of holes therethrough, the plate member having a center hole therethrough being proportionately spaced from the pair of pin tubes, the pair of pin tubes being fixedly attached to the front side of the plate member, each pin tube having an axial hole therethrough;

a pair of U-bolts with each having a pair of prongs, each prong having a threaded end capable of receiving a nut, each of the U-bolts being positionable about a gear rack of an ATV, the pair of prongs of each U-bolt being positioned through two of the plurality of holes of the plate member for coupling the plate member to the gear rack, each U-bolt being fastened to the gear rack and the plate member simultaneously when the prongs are positioned through the holes and each threaded end being engaged by the nut;

a pair of L-pins with each having an elongated vertical extent integral with a horizontal extent with a connecting curve therebetween, the vertical extent of each L-pin being positionable within one of the pin tubes of the mounting mechanism, each horizontal extent having a neck ring positioned thereon and adjacent the connecting curve, each vertical extent having a horizontal opening therethrough capable of aligning with the axial hole of the corresponding pin tube when positioned therein, the pair of L-pins being lockingly positioned within the pin tubes when the plate is fastened to the gear rack by the pair of U-bolts; and a rifle scabbard having a housing member with a cover hingedly attached thereto, the housing member having a bottom side with a mounting flange and a rear end, the mounting flange having a plurality of axial holes therethrough, the rear end of the bottom side having a hook member, the cover having a handle projecting from a top side thereof and a latch attached to a rear end of the cover, the latch being positionable over the hook of the housing for securing a rifle within the scabbard, the holes of the mounting flange being capable of receiving the horizontal extents of the L-pins for coupling the scabbard to the mounting mechanism, whereby when the plate is fastened to the gear rack the scabbard is mounted thereto for transporting on the ATV.

2. An ATV utility mount and attachment comprising:

a mounting mechanism having a plate member with a pair of pin tubes attached to a front side thereof;

a pair of U-bolts with each having a pair of prongs and being positionable about a gear rack of an ATV, each U-bolt being fastenable to the gear rack and the plate simultaneously;

a pair of L-pins with each having a vertical extent integral with a horizontal extent with a connecting curve therebetween, the vertical extent of each L-pin being positioned within one of the pin tubes of the mounting mechanism when the plate is fastened to the gear rack by the pair of U-bolts; and an accessory with an attaching means for coupling to the mounting mechanism for transporting on the ATV.

3. The ATV utility mount and attachment as set forth in claim 2, wherein the plate member of the mounting mechanism has a back side and a plurality of holes through the plate member, the plate member having a center hole therethrough and proportionately spaced from the pair of pin tubes.

4. The ATV utility mount and attachment as set forth in claim 3, wherein each of the pair of pin tubes is fixedly attached to the front side of the plate member and has an axial hole therethrough.

5. The ATV utility mount and attachment as set forth in claim 4, wherein each horizontal extent has a neck ring positioned thereon and adjacent the connecting curve, each vertical extent having a horizontal opening therethrough capable of aligning with the axial hole of the corresponding pin tube positioned therein.

6. The ATV utility mount and attachment as set forth in claim 3, wherein the pair of prongs of each U-bolt is positioned through two of the plurality of holes of the plate for coupling the plate to the gear rack, and each prong of the U-bolts has a threaded end capable of receiving a nut when the prongs are positioned through the holes.

7. The ATV utility mount and attachment as set forth in claim 3, wherein the accessory is a bracket member having a base plate with a vertical plate extending upwardly therefrom, the base plate having axial hole pairs spaced from an end edge thereof, the vertical plate being the attaching means and having a pivot tube and a plurality of angle holes, the pivot tube being positioned within the center hole of the plate member of the mounting mechanism.

8. The ATV utility mount and attachment as set forth in claim 2, wherein the accessory is a rifle scabbard with a housing member having a cover hingedly attached and the attaching means is a mounting flange connected to said scabbard.

9. The ATV utility mount and attachment as set forth in claim 8, wherein the housing member of the rifle scabbard has a bottom side including the mounting flange and a rear end, the mounting flange having a plurality of axial holes therethrough, the rear end having a hook member, and the holes of the mounting flange being capable of receiving the horizontal extents of the L-pins for coupling the scabbard to the mounting mechanism.

10. The ATV utility mount and attachment as set forth in claim 8, wherein the cover has a handle projecting from a top side thereof and a latch attached to a rear end of the cover, and the latch being positionable over the hook of the housing for securing a rifle within the scabbard.

* * * * *